Jan. 26, 1926.

H. SCHULZ 1,571,066

REFRACTOMETER

Filed March 21, 1924

Inventor:

Hans Schulz
by Leo J. Matty atty.

Patented Jan. 26, 1926.

1,571,066

UNITED STATES PATENT OFFICE.

HANS SCHULZ, OF GROSSLICHTERFELDE-OST, NEAR BERLIN, GERMANY, ASSIGNOR TO OPTISCHE ANSTALT C. P. GOERZ AKTIENGESELLSCHAFT, OF FRIEDENAU, NEAR BERLIN, GERMANY.

REFRACTOMETER.

Application filed March 21, 1924. Serial No. 700,784.

*To all whom it may concern:*

Be it known that I, Dr. Phil. HANS SCHULZ, a citizen of the German Republic, residing at Grosslichterfelde-Ost, near Berlin, Germany, have invented certain new and useful Improvements in Refractometers, of which the following is a specification.

The refraction measured in refractometers for fluids does not depend only upon the chemical and physical properties of the fluid to be tested but also upon its temperature when the test is made; so that the refractometers of this kind must be provided with a separate temperature-compensating device if the results of the test are to be reliable and immediately comparable.

This invention relates to a construction of a refractometer of the kind referred to, in which temperature is compensated for in a particularly simple way.

In the apparatus according to the present invention a wedge-shaped optical device fitted with a scale is disposed in the path followed by the rays between the measuring prism and the lens. This adjustable optical device deflects the rays from the measuring prism on their way to the lens and to the refraction-indicating scale. Experience has shown that the same optical device and the same setting thereof relatively to a temperature scale are sufficient (within the range of ordinary temperatures and refractions) to give the required temperature-compensation within the limits of accuracy of the test. It is advisable to replace the single optical device by a pair of such devices, coupled together and movable relatively to each other, for the purpose of preventing lateral displacements of the image owing to the deflection produced by the movable optical device.

Figure 1:
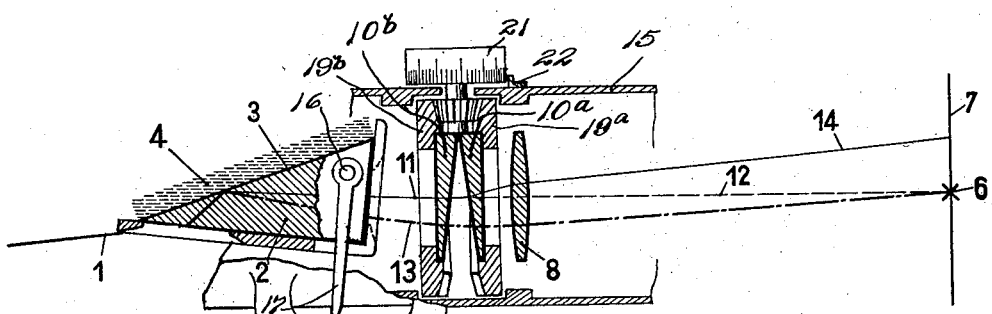
Figure 2:
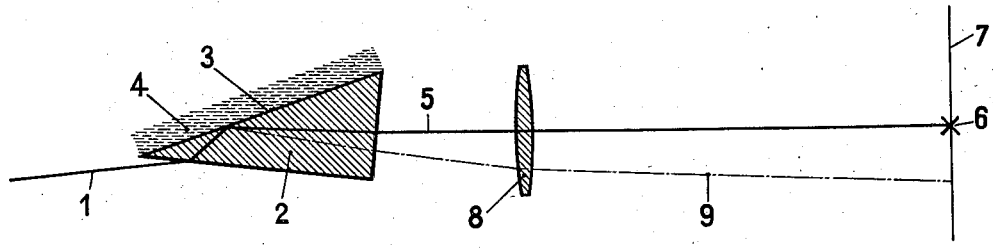

In the accompanying drawings,

Figure 1 illustrates the action of a pair of such optical devices in the path of the rays in a refractometer, and Figure 2 shows the alterations produced by temperature on the path of the rays in a refractometer of the usual kind, that is to say not fitted with a movable temperature-compensating optical device.

In both figures full line 1 is a ray of light entering a measuring prism 2, the figures of the drawing showing the path followed by the said ray for two dissimilar temperatures of the liquid to be tested. The ray of light 1 is deflected by the reflection surface 3 of the measuring prism 2 in accordance with the properties and the temperature of the liquid 4 to be tested, lying on said reflection surface 3.

Referring to Figure 2, the full line 5 is the path followed by the ray reflected by the surface 3 at normal temperature. It is assumed in this connection that the apparatus is of the kind in which the measuring prism 2 can be moved so that the boundary line between the illuminated and unilluminated parts of the field coincides with a mark 6 on a plate 7 in the focal plane. In this case the ray 5 is parallel to the axis of the lens 8 in the arrangement according to Figure 2, in which no temperature-compensating device is provided.

The path followed by the boundary ray between the illuminated and unilluminated portion of the field, and deflected by the surface 3 is deviated when the temperature of the liquid 4 alters. The deviated path 9 of the ray is illustrated in Figure 2 in a chain line, the said ray reaching the focal plane laterally of the mark 6, so that the measuring prism 2 must be moved further to make the ray coincident with the said mark. Obviously the readings of the apparatus are incorrect for a temperature other than normal.

This defect, inherent to the apparatus shown in Figure 2, is remedied by disposing the two wedge-shaped optical elements 10$^a$ and 10$^b$ (movable relatively to each other) in the parallel path of the rays between the measuring prism 2 and the lens 8, the said elements 10$^a$ and 10$^b$ having a suitable angle of refraction. The ray reflected at normal temperature is shown in Figure 1 by a continuous line 11. The path followed by this line between the reflecting surface 3 and the wedge-shaped member 10$^b$ is the same as that followed by the line 5 in Figure 2 in a corresponding section. When the optical elements 10$^a$ and 10$^b$ are adjusted for normal temperature, the line 11 follows a further rectilinear course, that is to say follows the path of line 5 in Figure 2 throughout its length. This portion of the path of the ray is shown by the dotted line 12 in Figure 1. The reflected ray 1 is deflected as in Figure 2 at a temperature other than normal. The path of this ray is shown in Figure 1 by a chain line 13. The optical elements 10ᵃ and 10ᵇ are now adjusted for the temperature of the liquid under test, the measuring prism 2 being moved so that the ray 13, which is the boundary between the illuminated and the unilluminated parts of the field, is coincident with the mark 6 in the focal plane 7. It is now possible to read directly on the refraction-indicating scale (not shown in the drawings) the refractive index of the liquid 4 in relation to normal temperature or dependent thereon. Let it now be assumed, with reference to Figure 1, that the optical elements 10ᵃ and 10ᵇ take up a position corresponding to a definite test temperature, the said position being different from that taken up at normal temperature. Should a reading be taken at normal temperature when the elements are in this position, it will be seen that the ray follows the path 14 and reaches the focal plane at 7, so that it would be necessary to move the measuring prism 2 to make the ray 14 coincident with the mark 6. The test or measurement would however be faulty, but would be corrected by setting the elements 10ᵃ and 10ᵇ at normal temperature.

In Figure 1 means are indicated in a somewhat diagrammatical manner to effect the required setting of the optical elements. 15 is a casing wherein the several optical elements are mounted. Prism 2 is rotatable in said casing about a pivot 16, the setting of the prism for which the pointer 17 is indicative can be read on scale 18. Each of the prisms 10ᵃ, 10ᵇ is firmly connected with a toothed ring 19ᵃ, 19ᵇ respectively the teeth of said rings meshing with a pinion 20 rotatably mounted in said casing and in firm connection with a scale carrying cylindrical drum 21 forming a handle for operating said pinion 20 and prisms 10ᵃ, 10ᵇ. 22 is a pointer co-operating with the scale of drum 21.

The scale on drum 21 is a temperature scale for setting the prisms 10ᵃ, 10ᵇ in conformity with the temperature at which the observation is made; scale 18 is the normal reading scale of the apparatus. Before making observations the drum 21 is adjusted in this way that the pointer 22 comes in line with the point of the scale indicating the working temperature. Thereafter the prism 2 is adjusted as usual and the adjustment read on scale 18; the reading giving the refractive index of the liquid tested.

Theoretically it would be necessary to use a special temperature scale on drum 21 for each kind of test liquid and for each concentration of same; however experience has shown that if the refracting angle of prism 2 is suitably chosen then for each special kind of solution to be tested the same temperature scale may be used irrespective the concentration of the solution.

What I claim is:—

1. A fluid-testing refractometer with a temperature compensating device, comprising an adjustable prism having a reflecting surface adapted to be brought into contact with the fluid to be tested, a lens disposed in the path of the rays coming from said reflective surface of the measuring prism, a wedge-shaped adjustable optical device disposed in the path of the rays between the measuring prism and said lens, the said adjustable optical device having coordinated thereto a setting scale and a mark carrying member arranged in the image plane of the instrument.

2. A fluid-testing refractometer with a temperature compensating device comprising an adjustable measuring prism having a reflecting surface adapted to be brought into contact with the fluid to be tested, a lens disposed in the path of the rays coming from said reflecting surface of the measuring prism, a pair of wedge-shaped light permeable bodies disposed in the path of the rays between the measuring prism and said lens cooperating so as to effect deflection of the rays passing therethrough without lateral displacement, said pair of wedge-shaped bodies having coordinated thereto a setting scale and a mark carrying member arranged in the image plane of the instrument.

In testimony whereof, I affix my signature.

Dr. HANS SCHULZ.